(12) United States Patent
Kolb et al.

(10) Patent No.: US 12,247,425 B2
(45) Date of Patent: Mar. 11, 2025

(54) LOCK FOR HOLDING A FIRST PART TO A SECOND PART AND ASSEMBLY OF A FIRST PART AND A SECOND PART

(71) Applicant: A. RAYMOND ET CIE, Grenoble (FR)

(72) Inventors: Christian Kolb, Binzen (DE);
Alexander Ruff, Weil am Rhein (DE);
Daniel Schreiyäck, Weil am Rhein-Ötlingen (DE)

(73) Assignee: A. RAYMOND ET CIE, Grenoble (FR)

( * ) Notice: Subject to any disclaimer, the term of this patent is extended or adjusted under 35 U.S.C. 154(b) by 400 days.

(21) Appl. No.: 17/715,308

(22) Filed: Apr. 7, 2022

(65) Prior Publication Data
US 2022/0412133 A1     Dec. 29, 2022

(30) Foreign Application Priority Data
May 31, 2021    (EP) ..................................... 21176842

(51) Int. Cl.
*B60N 2/015*     (2006.01)
*E05C 3/00*      (2006.01)
*E05C 3/14*      (2006.01)

(52) U.S. Cl.
CPC ............ *E05C 3/14* (2013.01); *B60N 2/01516* (2013.01); *B60N 2/01541* (2013.01); *E05C 3/006* (2013.01)

(58) Field of Classification Search
CPC .. B60N 2/01525; B60N 2/1541; B60N 2/015; F16B 21/073; F16B 21/075
See application file for complete search history.

(56) References Cited

U.S. PATENT DOCUMENTS

| 3,358,340 A | 12/1967 | Higuchi |
| 4,916,778 A | 4/1990  | Iguchi  |

(Continued)

FOREIGN PATENT DOCUMENTS

| CN | 104512280 B | 8/2017 |
| CN | 107487232 B | 2/2020 |

(Continued)

OTHER PUBLICATIONS

Machine assisted English translation of KR101403858B1 obtained from https://patents.google.com/patent on Mar. 30, 2022, 5 pages.

(Continued)

*Primary Examiner* — Robert Sandy
(74) *Attorney, Agent, or Firm* — Warner Norcross + Judd LLP

(57) ABSTRACT

A lock for holding a first part to a second part comprises a holding body with a receptacle for receiving a protruding part of the second part. The holding body has a wall that borders the receptacle and a locking element, the locking element having a protrusion, whereby the locking element has a first position, whereby in the first position the protrusion is in a locking position, whereby in the locking position the protrusion protrudes from the wall into the receptacle by a first amount and the locking element has a second position, whereby in the second position the protrusion is in a release position, whereby in the release position the protrusion either protrudes from the wall into the receptacle by a second amount, whereby the second amount is smaller than the first amount, or the protrusion does not protrude from the wall.

10 Claims, 11 Drawing Sheets

(56) References Cited

U.S. PATENT DOCUMENTS

| | | | | |
|---|---|---|---|---|
| 5,606,784 | A | * | 3/1997 | Hamamoto .......... F16B 45/005 |
| | | | | 410/116 |
| 6,145,173 | A | * | 11/2000 | Suzuki ................. F16B 5/0607 |
| | | | | 403/329 |
| 6,474,616 | B2 | * | 11/2002 | Yamada ................ B60N 2/682 |
| | | | | 296/43 |
| 8,780,797 | B2 | | 7/2014 | Chen et al. |
| 9,150,120 | B2 | * | 10/2015 | Antoine ............... F16B 21/075 |

FOREIGN PATENT DOCUMENTS

| | | |
|---|---|---|
| FR | 2957561 A1 | 10/2012 |
| KR | 101403858 B1 | 6/2014 |

OTHER PUBLICATIONS

Machine assisted English translation of CN104512280B obtained from https://patents.google.com/patent on Mar. 30, 2022, 7 pages.
Machine assisted English translation of CN107487232B obtained from https://patents.google.com/patent on Mar. 30, 2022, 6 pages.
Machine assisted English translation of FR2957561A1 obtained from https://patents.google.com/patent on Aug. 31, 2022, 5 pages.

* cited by examiner

LOCK FOR HOLDING A FIRST PART TO A SECOND PART AND ASSEMBLY OF A FIRST PART AND A SECOND PART

CROSS-REFERENCE TO RELATED APPLICATIONS

This application claims priority to and all advantages of European Patent Application No. 21166515.3, filed on 1 Apr. 2021, and to European Patent Application No. 21176842.9, filed on 31 May 2021, the contents of which are hereby incorporated by reference.

FIELD OF THE INVENTION

The invention pertains to a lock for holding a first part to a second part. The invention also pertains to an assembly of a first part and a second part. The invention also pertains to a method for disassembly of such an assembly. The invention also pertains to a method for assembly of such an assembly.

BACKGROUND OF THE INVENTION

From CN 107487232 BB a lock for holding a first part to a second part is known. The lock comprises a holding body that has a receptacle for receiving a protruding part of the second part. The holding body has a wall that borders the receptacle. The lock also has a locking element that can be slidably arranged in the holding body. The locking element has a protrusion, whereby the locking element has a first position, whereby in the first position the protrusion protrudes from the wall into the receptacle by a first amount (locking position), and the locking element has a second position, whereby in the second position the protrusion protrudes from the wall into the receptacle by a second amount, whereby the second amount is smaller than the first amount, or whereby in the second position the protrusion does not protrude from the wall (release position). The protrusion can be moved from the first position to the second position in a retraction direction relative to the holding body.

A lock for holding a first part to a second part is also known from CN104512280. A lock for holding a first part a second part is also known from KR 101403858 B1.

Given this background, the problem to be solved by the invention is to provide a lock for holding a first part to a second part that can be handled more easily by a worker.

BRIEF SUMMARY OF THE INVENTION

Disclosed is a lock for holding a first part to a second part, the lock comprising:
a holding body with a receptacle for receiving a protruding part of the second part, the holding body having a wall that borders the receptacle,
a locking element, the locking element having a protrusion, whereby the locking element has a first position, whereby in the first position the protrusion is in a locking position, whereby in the locking position the protrusion protrudes from the wall into the receptacle by a first amount, and the locking element has a second position, whereby in the second position the protrusion is in a release position, whereby in the release position:
the protrusion either protrudes from the wall into the receptacle by a second amount, whereby the second amount is smaller than the first amount, or
the protrusion does not protrude from the wall,
whereby the protrusion can be moved from the locking position to the release position in a rotational retraction direction relative to the holding body, and a lever, whereby
the lever has a first end and a second end that is arranged opposite the first end, whereby the protrusion is attached to the first end of the lever or forms part of the first end of the lever, and
the lever is connected to the holding body by a rotational joint or is connected to an attachment body by a rotational joint, whereby the attachment body is attached to the holding body,
whereby the rotational joint is arranged between the first end and the second end of the lever, and
applying a force to the second end that is directed towards the receptacle leads to:
a swivel movement of the lever in the rotational joint, and
a movement of the protrusion in the retraction direction.

The basic concept of the lock according to the invention is to have the retraction direction be a rotational retraction direction and for it to be in a certain sense the opposite direction of a pushing direction, with which the locking element can be moved. For example in CN 107487232 a push onto the locking element leads for the protrusion to move in the same direction as the pushing direction. Here the retraction direction would be the same direction as the pushing direction. That means, however, that space needs to be provided at the opposite end of the holding body in order to allow the protrusion to move at least partially out of the receptacle when the locking element is pushed. The basic concept of the invention, however, is to have the retraction direction of the protrusion to be the opposite direction of a pushing movement of the locking element.

This basic concept of the invention is implemented by providing the lock according to the invention with at least one lever. According to the invention the lever has a first end and a second end that is arranged opposite the first end, whereby the protrusion is attached to the first end of the lever or forms a part of the first end of the lever. According to the invention the lever is connected to the holding body by a rotational joint or the lever is connected to an attachment body by a rotational joint, whereby the attachment body is attached to the holding body.

The rotational joint is arranged between the first end and the second end of the lever.

According to the invention, applying a force to the second end that is directed towards the receptacle leads to a swivel movement of the lever in the rotational joint. This leads to a movement of the protrusion in the retraction direction. It can be said that providing the lever allows the application of force to the second end of the lever to be translated into a movement of the protrusion in the opposite direction. Pushing the locking element in leads to the protrusion being pulled out.

The lock has a holding body with a receptacle for receiving a protruding part of the second part. A holding body can be an individual body that can be attached to the first part. A holding body can, for example be made by injection moulding. A holding body can, however, also be made as one part of the first part.

The holding body has a wall that borders the receptacle. The holding body can have more than one wall that borders the receptacle. For example if the receptacle has a rectangular cross-section, the holding body will have a first wall, a second wall, a third wall, a fourth wall that each border the receptacle and between them give the receptacle its rectangular shape. In a preferred embodiment, the receptacle has a bottom wall. The receptacle preferably is made like a cul-de-sac having one opening that allows the protruding part of the second part to be inserted the remainder of the receptacle being delineated by the walls. The bottom wall can be used as a limitation to pushing the protruding part of the second part into the receptacle. The protruding part of the second part can only be pushed into the receptacle until the tip of the protruding part contacts the bottom wall of the receptacle. However, designs are also feasible, where the receptacle has no bottom wall. Designs are also feasible, where the walls of the holding body that border the receptacle have openings. The walls that border the receptacle can also be more of the style of a frame.

The holding body is said in claim 1 to have a wall that borders the receptacle in order to define the reference plane within the holding body relative to which reference plane the position of the protrusion of the locking element for the locking position and the release position can be described.

In a preferred embodiment the wall that borders the receptacle is arranged on a first part of the holding body, whereby a further wall that is arranged on the other side of the receptacle and faces the wall is additionally provided, whereby the further wall is arranged on a second part of the holding body. In a preferred embodiment the first part of the holding body has an upper surface that is arranged in a first plane, whereby the second part of the holding body has an upper surface that is arranged in a second plane, whereby the first plane is above the second plane. In a preferred embodiment the first part of the holding body is longer than the second part of the holding body.

In a preferred embodiment, the holding body has an outward facing surface that is arranged flush with an outward facing surface of the lever. In a preferred embodiment the first part of the holding body has an outward facing surface that is arranged flush with an outward facing surface of the lever. Having on outward facing surface of the holding body being arranged flush with an outward facing surface of the lever prevents the lever from being pushed by a large object. Having on outward facing surface of holding body being arranged flush with an outward facing surface of the lever requires the lever to be pushed by an element that has the same size or is smaller than the outward facing surface of the lever. In a preferred embodiment, no part of the second end of the lever protrudes over an outward facing surface of the holding body when the lever is in the first position.

In a preferred embodiment, the wall that borders the receptacle may have a hole or a recess and the locking element may protrude through the hole or the recess into the receptacle. According to the invention the locking element has a second position, whereby in the second position the protrusion is in a release position, whereby in the release position
   the protrusion either protrudes from the wall into the receptacle by a second amount, whereby the second amount is smaller than the first amount,
   or the protrusion does not protrude from the wall.

In the preferred embodiment, where the wall that borders the receptacle has a hole or a recess, the locking element is arranged at least partially, preferably completely inside the hole or inside the recess in the second position. Hence, in a preferred embodiment, when the locking element is moved from the first position (the locking position) into the second position (the release position) the locking element is moved more deeply into the hole or the recess. This includes the option that the locking element at least partially protrudes from the wall that borders the receptacle at the opposite side compared to the receptacle. The wall may have a first surface that borders the receptacle and a second surface that is arranged on the opposite side of the wall and hence faces away from the receptacle. The locking element may protrude from this second surface in the second position. This depends on the size of the locking element and the wall thickness of the wall. If the locking element is thicker than the wall thickness of the wall, the locking element will partially protrude over the second surface of the wall (the surface that faces away from the wall) in the second position.

Embodiments are feasible, where the locking element in the first position is not arranged within the hole or the recess. In such an embodiment, the locking element that in the first position is not arranged within the hole or the recess would be moved into the hole or recess as it moves from the first position into the second position. This includes the option that the locking element at least partially protrudes from the wall that borders the receptacle at the opposite side compared to the receptacle (the second surface of the wall). Embodiments are also feasible, where the locking element in the first position is partially arranged within the hole or the recess, but is moved more deeply into the hole or the recess as the locking element moves from the first position to the second position. This includes the option that the locking element at least partially protrudes from the wall that borders the receptacle at the opposite side compared to the receptacle (the second surface of the wall).

In a preferred embodiment, the holding body has a first wall that borders the receptacle, whereby in the locking position the protrusion protrudes from the first wall into the receptacle by a first amount and whereby in the release position
   the protrusion either protrudes from the first wall into the receptacle by a second amount, whereby the second amount is smaller than the first amount,
   or the protrusion does not protrude from the first wall, whereby in this preferred embodiment the holding body has a second wall that borders the receptacle, whereby the second wall is arranged opposite the first wall and whereby the second wall has a hole or a recess, whereby the protrusion has a tip, whereby the protrusion can be brought into a position, where the tip of the protrusion engages the hole or recess in the second wall. In a first alternative, the tip of the protrusion engages the hole or recess in the second wall when the protrusion is in the locking position. In a second alternative, the tip of the protrusion engages the hole or recess in the second wall in a forward position, whereby in the forward position the protrusion protrudes from the first wall into the receptacle by an amount that is larger than the first amount.

In a preferred embodiment, the recess is provided by way of a section of the second wall protruding towards the first wall over other sections of the second wall.

The lock according to the invention has a locking element. The purpose of the locking element is to hold the protruding part of the second part in the receptacle, once the protruding part of the second part has been introduced into the receptacle. For this purpose, the locking element has a protrusion. The locking element has a first position, whereby in the first position the protrusion protrudes from the wall into the receptacle by a first amount. This position of the protrusion is called the locking position. The locking element also has a second position, whereby when the locking element is in the second position, the protrusion protrudes from the wall into the receptacle by a second amount, whereby the second amount is smaller than the first amount or as an alternative the protrusion does not protrude from the wall into the receptacle at all when the locking element is in the second position. The position of the protrusion when the locking element is in the second position is called the release position.

The form and shape of the protrusion can be chosen in dependence of the form and shape of the protruding part of the second part that is received in the receptacle. According to the invention, it is intended, that the protrusion in the locking position blocks the protruding part of the second part from being retracted from the receptacle, while the protrusion in the release position allows the protruding part of the second part to be retracted from the receptacle.

According to the invention, the protrusion can be moved from the locking position to the release position in a rotational retraction direction relative to the holding body, for example a circumferential direction of a rotational movement.

In a preferred embodiment, the lever is a longitudinal element. A longitudinal element is understood to be an element, which has a length, a height and a width, whereby the maximum length is larger by a factor of at least two, preferably by a factor of at least three, more preferably by a factor of at least four than the maximum width and/or the maximum height of the element. In a preferred embodiment, the lever is a solid element and acts like a bar.

According to the invention the lever has a first end and a second and that is arranged opposite the first end, whereby the protrusion is attached to the first end of the lever. The protrusion can be directly and rigidly attached to the first end of the lever; it can even be formed as one piece with the lever. This would mean that the protrusion would follow in its movement the path of movement of the first end.

In one alternative of the invention, the lever is connected to the holding body by a rotational joint, whereby the rotational joint is arranged between the first end and the second end. In a second alternative of the invention, the lever is connected to an attachment body by a rotational joint, whereby the attachment body is attached to the holding body.

The lever, the joint and the attachment body can all be parts of an one-piece element, for example an element that is created by molding. In a preferred embodiment the joint is provided by a torsion bar. The lever, the torsion bar and the attachment body can all be parts of an one-piece element, for example an element that is created by molding.

According to the invention the applying of force to the second end of the lever that is directed towards the receptacle leads to a swivel movement of the lever in the rotational joint and leads to a movement of the protrusion in the rotational retraction direction. By introducing the lever, the invention provides the possibility of applying a force in one direction (for example a pushing force onto the locking element) that by way of the lever swiveling in the rotational joint is translated into a movement of the protrusion of the locking element into the opposite direction.

In a preferred embodiment, the attachment body has a first end that is attached to the joint and has a second end that is distanced from the first end. In a preferred embodiment, a locking protrusion is arranged at the second end of attachment protrusion, whereby the locking protrusion can be engaged with a part of the holding body to hold the attachment body in a predetermined position in the holding body.

In a preferred embodiment, a guide arm is arranged at the second end of the attachment body, whereby the guide arm is arranged in a channel in the holding body.

In a preferred embodiment, the holding body is made of plastic material. In a preferred embodiment, the holding body is made by way of injection moulding. In a preferred embodiment, the locking element is made of plastic material. In a preferred embodiment, the locking element is made by way of injection moulding. The locking element could, for example, also be made by way of stamping from a blank In a preferred embodiment the holding body and/or the locking element and most preferably the entire lock is designed to be mirror-symmetrical about a plane that dissects the protrusion and include the retraction direction.

In a preferred embodiment the protruding part of the second part is introduced into the receptacle along a linear insertion direction.

In a preferred embodiment, the rotational axis about which the lever rotates in the rotational joint is antiparallel to the linear insertion direction and preferably is perpendicular to the linear insertion direction.

In a preferred embodiment the holding body and/or the locking element and most preferably the entire lock is designed to be mirror-symmetrical about a plane that includes the retraction direction and the linear insertion direction.

In a preferred embodiment, the protrusion of the locking element is designed to be wedge shaped. In a preferred embodiment, the protrusion of the locking element has a tip. The wedge shaped protrusion of the locking element in a preferred embodiment has its slimmest portion at the tip and then increases in thickness further away from the tip. The wedge shaped protrusion can have a push back surface at its underside that can come into contact with the protruding part as the protruding part is moved upwards and if the protrusion is in the release position or close to the release position. If for example the protrusion has been moved from the locking position towards the release position and has either reached the release position or is close to the release position and in this position is in the way of the protruding element, the push back surface of the protrusion can lead to the protruding part pushing the protrusion further into the release direction when the protruding part contacts the push back surface of the wedge shaped protrusion.

In a preferred embodiment, the protrusion can have a pull out surface at its underside that is pointing towards the wall and is arranged at an angle to the release direction, whereby the pull out surface can come into contact with the protruding part as the protruding part is moved upwards and if the protrusion is in the locking position or close to the locking position. If for example the protrusion is in the locking position or close to the locking position and in this position is in the way of the protruding element, the pull out surface can lead to the protruding part pulling the protrusion further away from the wall and against the release direction when the protruding part contacts the pull out surface. Such an arrangement can be used, for example to bring the tip of the protrusion into contact with a hole or a recess in a second wall of the receptacle. This arrangement can secure the protruding part in the receptacle. The more the protruding part is tried to be pulled out of the receptacle, the more the protrusion is pulled out and prevents the protruding part from being pulled out of the receptacle.

In a preferred embodiment, the locking element has a spring. The spring can be a torsion bar is the joint. As an alternative or in addition a spring, for example a leaf spring or a coil spring can be provided. In a preferred embodiment the spring is tensioned as the lever is moved to bring the locking element from the first position towards the second position. If the spring is tensioned as the lever is moved to bring the locking element from the first position towards the second position, the spring will push the lever and hence the locking element back towards the first position once the force has been taken away.

In a preferred embodiment, the spring is loaded when the locking element is in the second position. The loading of the spring pretensions the locking element to move from the second position into the first position.

In a preferred embodiment, the lever is a part of the locking element. In a preferred embodiment, the protrusion, the lever and—if present—the locking protrusion of the lever, the guide arm of the lever are all part of the locking element and made as one piece, for example by way of injection moulding or by way of stamping from a blank.

In a preferred embodiment the rotational joint defines a rotational axis and the lever swivels about the rotational axis, whereby the rotational axis is not parallel to an insertion direction, whereby the insertion direction is the direction along which the second protruding part of the second part is intended to be inserted into the receptacle. In a preferred embodiment, the insertion direction is a direction that runs parallel to the surface of the wall that borders the receptacle.

In a preferred embodiment a torsion bar is provided that extends from the lever, which torsion bar has an end that is held in the holding body or held in the attachment body. The torsion bar can act as a spring that pretensions the protrusion into the locking position. If the lever is rotate so that the protrusion moves from the locking position towards the release position, the torsion bar is loaded. If the force that is applied to the lever to rotate so that the protrusion moves from the locking position towards the release position is reduced or taken away, the loaded torsion bar leads to a return movement of the lever and leads to the protrusion being moved towards and preferably into the locking position.

In a preferred embodiment the holding body has a recess and the attachment body has a portion that is arranged in the recess. In a preferred embodiment the circumferential walls of the holding body that form the recess and the circumferential walls of the portion of the attachment body that is arranged in the recess are adapted to each other to prevent the attachment body from rotation. In a preferred embodiment, the recess is of polygonial shape, preferably square shaped, triangular shaped, rectangular shaped. In a preferred embodiment, the portion of the attachment body arranged in the recess is of polygonial shape, preferably square shaped, triangular shaped, rectangular shaped.

In a preferred embodiment the recess has a bottom wall and a channel that leads from the bottom wall further into the holding body. In a preferred embodiment, the attachment body has a portion that is arranged in the recess and that has an abutment surface that abuts against the bottom wall, whereby the attachment body has an arm that extends into the channel In a preferred embodiment, the arm has a locking protrusion. In a preferred embodiment, the locking protrusion engages a part of the holding body that faces away from the bottom wall, such that the engagement of the locking protrusion with this part prevents the attachment body from being pulled out of the recess.

In a preferred embodiment the holding body has attachment projections that can be used to attach the holding body to the first part.

In a preferred embodiment of the assembly according to the invention, the first part has a recess and the holding body is at least partially arranged in the recess. The attachment projections can be used to define the position of the holding body inside the recess of the first part, e.g. can determine how deep the holding body can be inserted into the recess. The attachment projections can protrude laterally from the holding body and can come into surface contact with a lateral surface of the first part that surrounds the recess of the first part, thereby defining the position of the holding body inside the recess of the first part. The holding part can be glued or welded to the first part. In a preferred embodiment, the holding part is attached to the first part by way of gluing or welding an attachment projection to the first part. Also, as an alternative or in addition the holding body can be wedged or crimped into a recess of the first part. Ribs can be provided on outward facing surfaces of the holding body, especially on the wall or the attachment projection that aid the wedging into the recess of the first part.

The assembly according to the invention has a first part and a second part whereby the first part is connected to the holding body of the lock (which is to be understood to include those embodiments where the holding body is an element of the first part) and whereby the second part comprises a protruding part with an opening or a recess, protruding part is arranged in the receptacle and wherein the protrusion of the locking element is in the locking position and at least partially arranged inside the protruding part.

In a preferred embodiment, the protruding part is a U-shaped protruding part. In a preferred embodiment the protruding part can be a part of a hook. In a preferred embodiment the protruding part can have wedged portion at its end, the wedged portion forming a tip of the protruding part and whereby the protruding part has a recess at the end of the wedged portion, the recess preferably being designed as a step after the wedged portion.

In a preferred embodiment the protruding part is a wire. In an alternative embodiment, the protruding part is a piece stamped out from a metal sheet.

In a preferred embodiment, the first part is a part of a vehicle, for example the cushion of the backbench of a vehicle. In a preferred embodiment, the second part of the assembly is a part of a vehicle, for example a frame or a floor or a wall of the vehicle. In a preferred embodiment, the lock according to the invention is used to attach the part of the upholstering, especially a cushion of a backbench of a car to the body of the car.

The method for disassembly of an assembly according to the invention is characterized in that a force is applied to the second end of the lever that is directed against the retraction direction, which application of force leads to a swivel movement of the lever about the protruding piece of the holding body or in the rotational joint and leads to a movement of the protrusion in the retraction direction into the release position, whereby in the release position the protrusion of the locking element is arranged outside the U-shaped protruding part. As part of the method according to the invention, the U-shaped protruding part is moved out of the receptacle.

The method for assembly of an assembly according to the invention provides that
  in a first step the protruding part of the second part is arranged inside the receptacle of the lock and the protrusion of the locking element is in the first position and at least partially arranged inside protruding part and in a second step the first part is connected to the holding body of the lock.

This provides the opportunity that the second part with the lock being attached to the protruding part of the second part by way of the protrusion of the locking element being in the first position and at least partially arranged inside protruding part can be delivered pre-assembled. The attachment to the first part will then take place by attaching the holding body of the lock to the first part. While in the prior art, typically the lock is already attached to the first body prior to the assembly being assembled, the method for assembly first assembles the lock to the second part and then attaches the holding body of the lock to the first part.

BRIEF DESCRIPTION OF THE DRAWINGS

In the following, the invention will be described by reference of figures that only show exemplary embodiments. In the figures.

DETAILED DESCRIPTION

Figure 1:
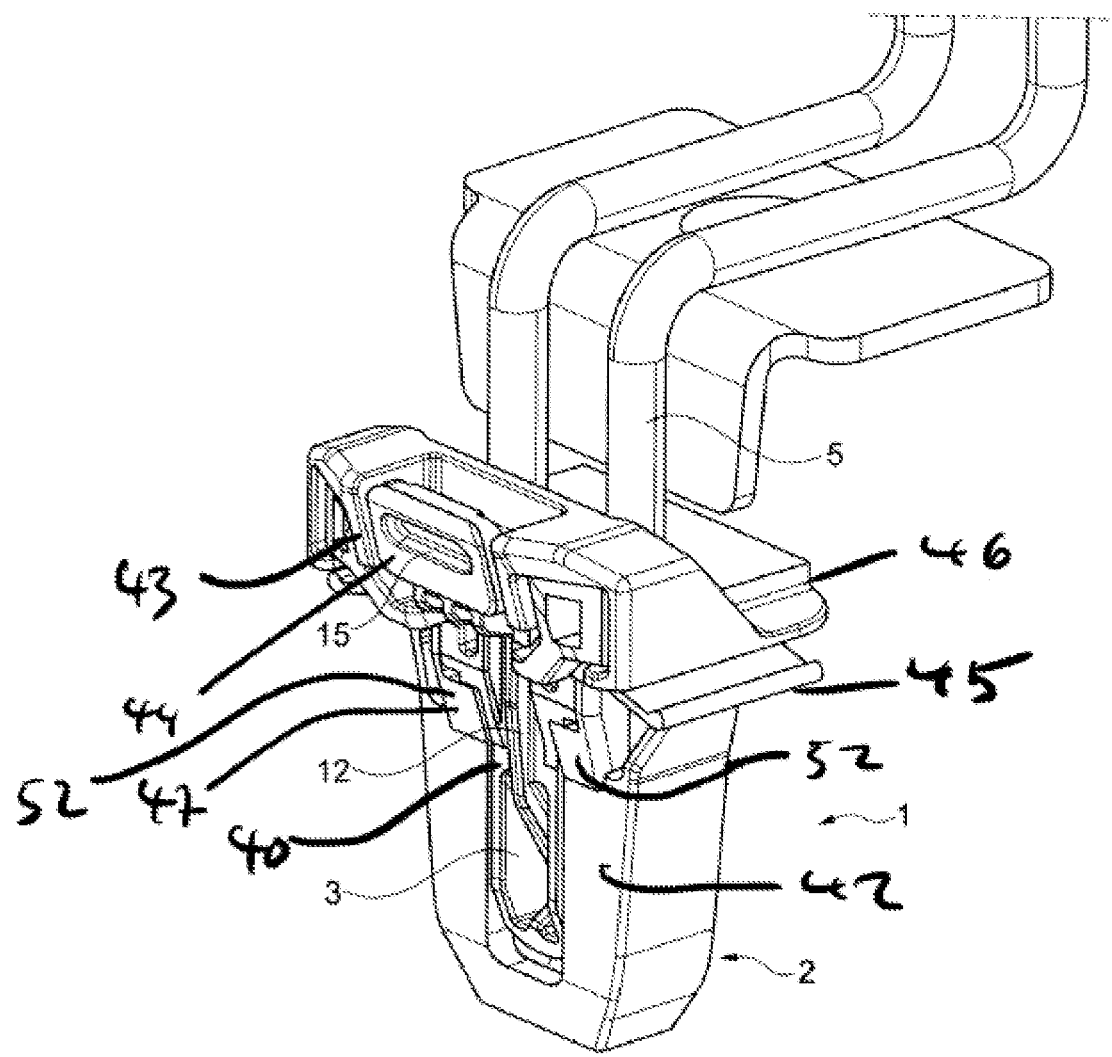
FIG. 1 shows a perspective view of the lock according to the invention with a protruding part of a second part arranged in the receptacle.

FIG. 1 shows a lock 1 for holding a first part to a second part. The lock 1 comprises a holding body 2 and a locking element 3. The holding body 2 has a receptacle 4 for receiving a u-shaped protruding part 5 of the second part. The holding body having a wall 6 and further walls 7 and a bottom wall 10 that border the receptacle. The receptacle is a cul-de-sac.

The locking element 3 has a protrusion 11. The locking element 3 has a first position shown in FIG. 1, 4, 6, 7. In the first position of the locking element 3, the protrusion 11 protrudes from the wall 6 into the receptacle 4 by a first amount. This position of the protrusion 11 is called the locking position.

Figure 5:
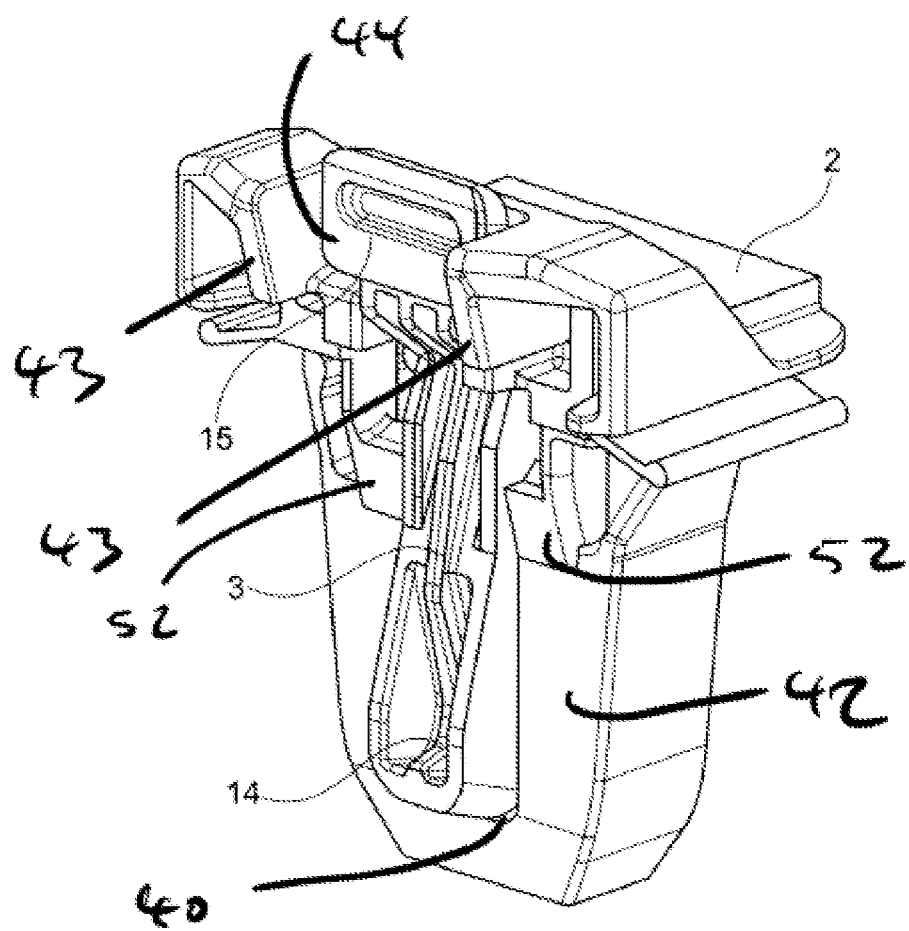
FIG. 5 shows a further perspective view of the lock according to the invention according to FIG. 1, the protrusion being in the release position.
Figure 8:
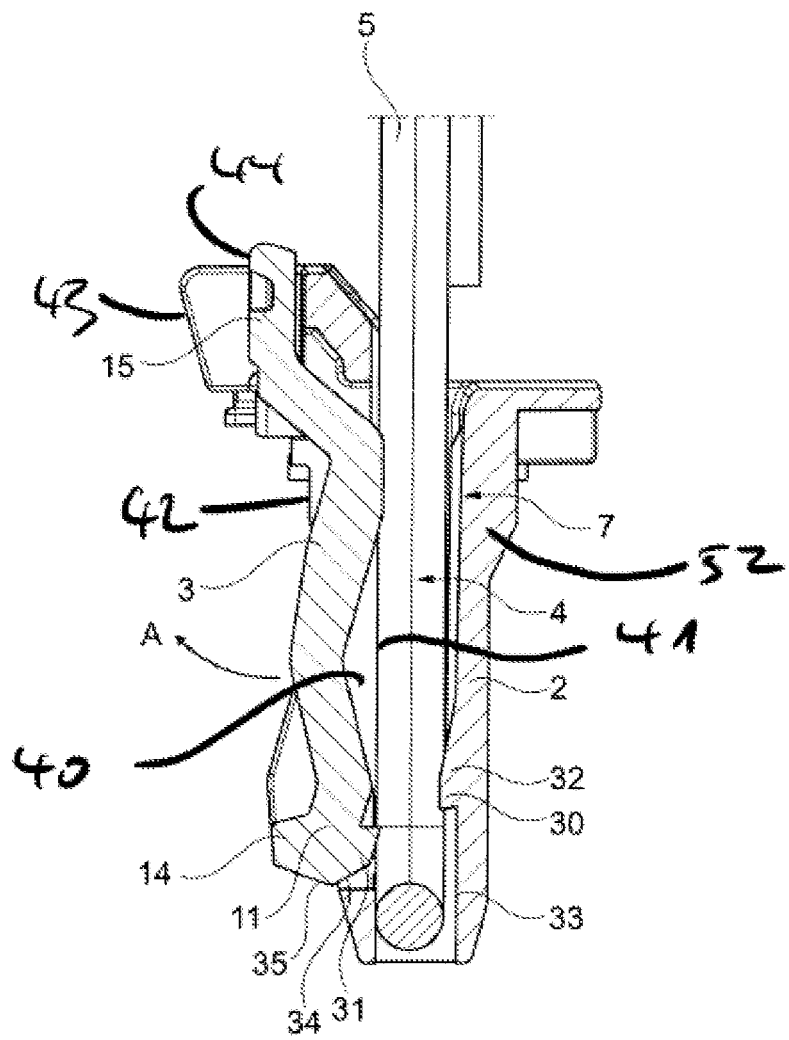
FIG. 8 shows a sectional side view through the lock according to FIG. 1, the section side view going through the middle of the lock, the protrusion being in the locking position.

The locking element 3 has a second position (shown in FIGS. 5 and 8). In the second position the protrusion 11 protrudes from the wall 6 into the receptacle 4 by a second amount, whereby the second amount is smaller than the first amount. This position of the protrusion 11 is called the release position.

Figure 6:
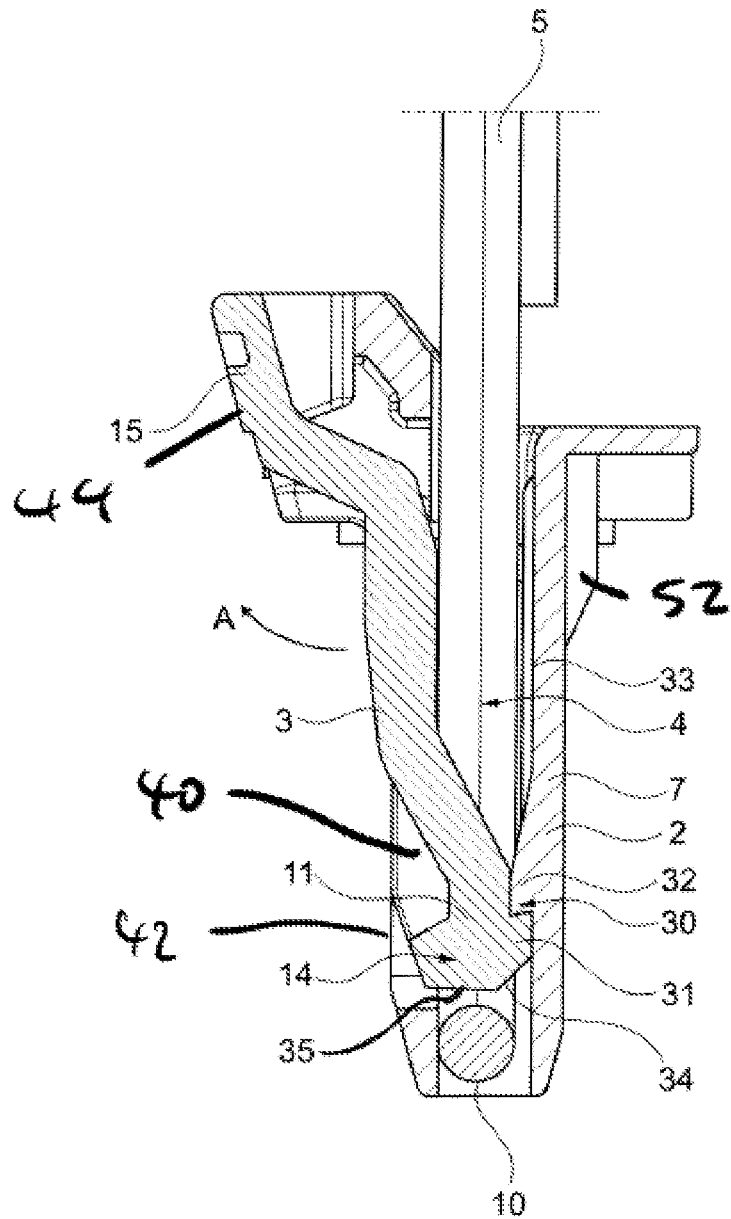
FIG. 6 shows a sectional side view through the lock according to FIG. 1, the section side view going through the middle of the lock, the protrusion being in the locking position.
Figure 7:
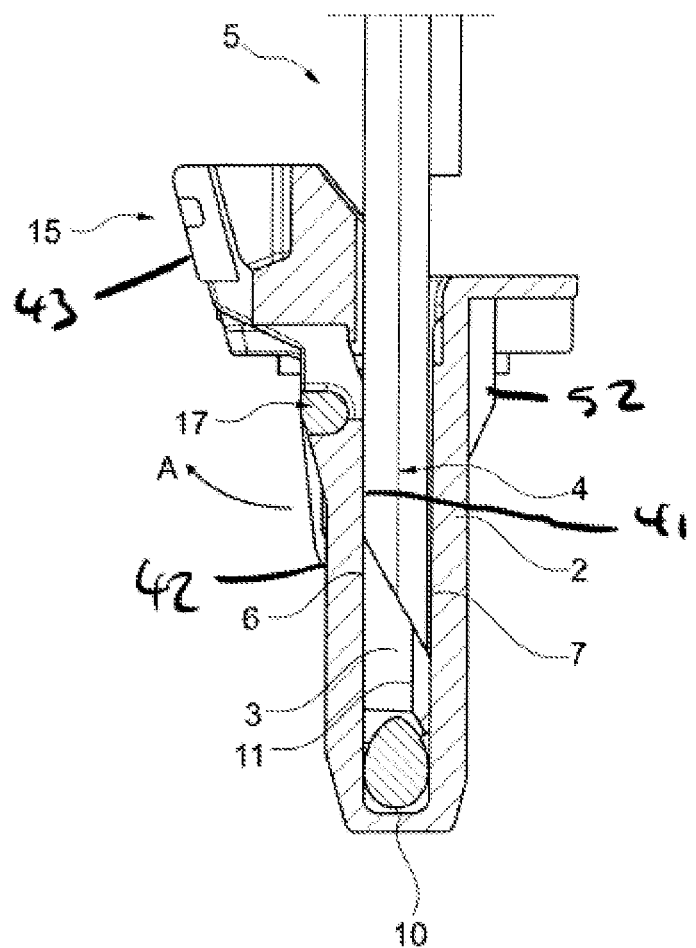
FIG. 7 shows a sectional side view through the lock according to FIG. 1, the section side view going through a part arranged further towards the right from the middle in the view of FIG. 1, the protrusion being in the locking position.

In the locking position, the protrusion 11 is placed inside the u-shaped protruding part 5 and prevents the protruding part 5 to be retrieved (pulled out) from the receptacle 4 (see FIG. 6, 7). In the release position, the protrusion 11 is placed outside the u-shaped protruding part and allows the protruding part 5 to be retrieved (pulled out) from the receptacle 4 (see FIG. 8).

The protrusion 11 can be moved from the locking position to the release position in a rotational retraction direction A relatively to the holding body 2.

The lock 1 has a lever 12. The lever 12 has a first end 14 and a second end 15 that is arranged opposite the first end 14. The protrusion 11 forms part of the first end 14 of the lever 12.

Figure 3:
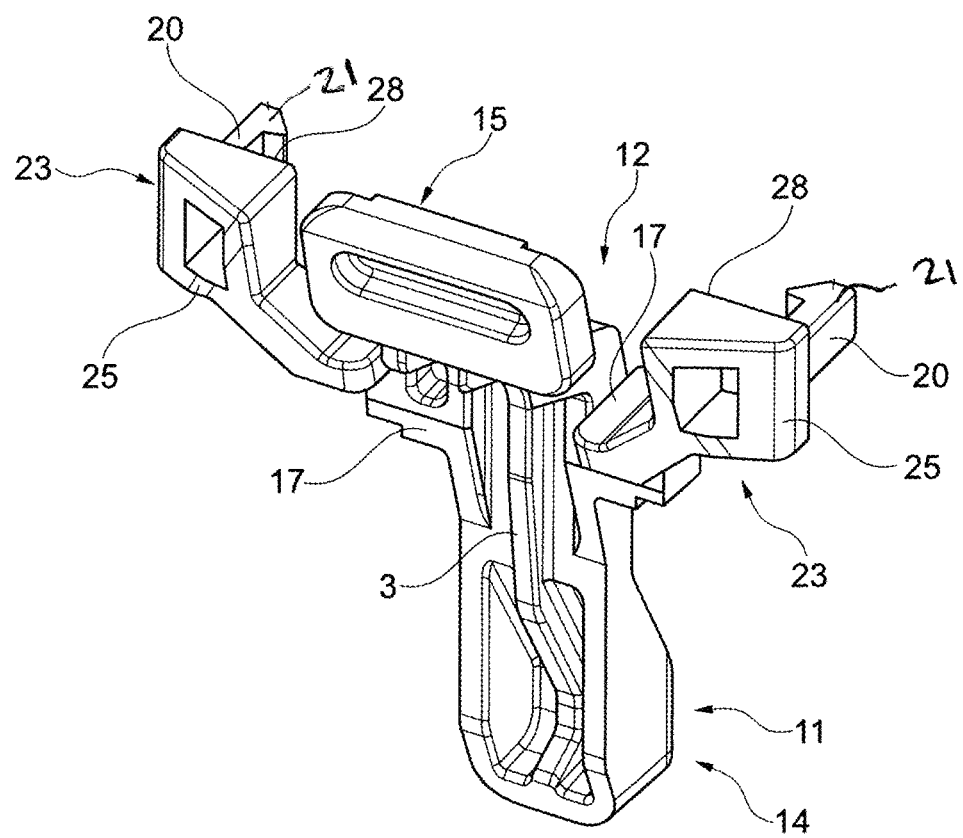
FIG. 3 shows a perspective view onto the locking element of the lock according to FIG. 1.

As seen in FIG. 3, 7 the lever 12 has two torsion bars 17 that function as part of a joint. The respective torsion bar 17 is arranged between the lever 12 and an attachment body 23. A protrusion of the attachment body 23 rests in a respective recess 18 in the holding body 2.

Figure 2:
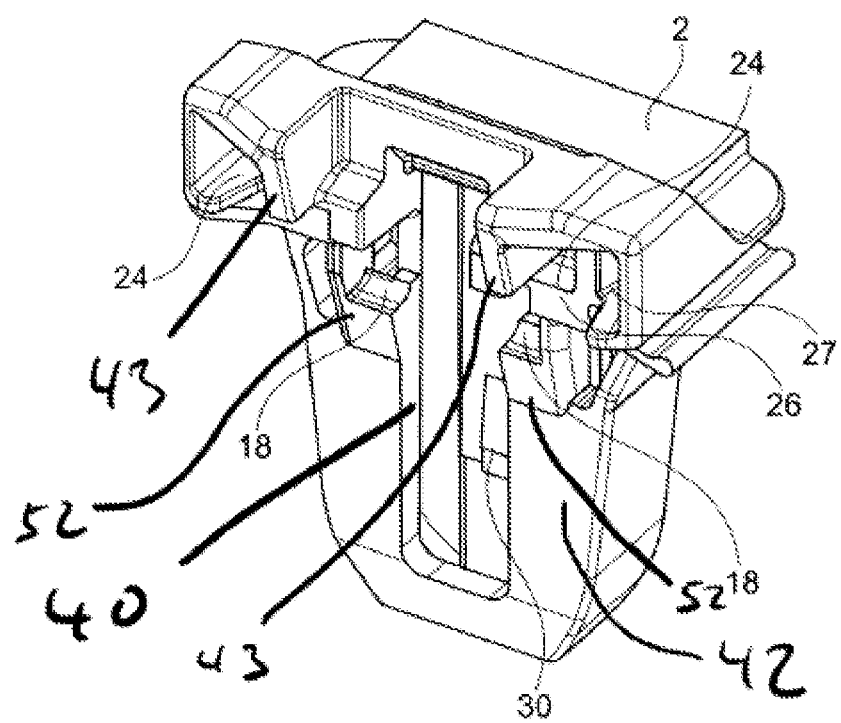
FIG. 2 shows a perspective view onto the holding body of the lock according to FIG. 1.

The holding body 2 has a recess 24 (see FIG. 2) and the attachment body has a portion 25 that is arranged in the recess 24. The recess is square shaped and the portion 25 of the attachment body 23 arranged in the recess 24 is of square shape.

The recess 24 has a bottom wall 26 and a channel 27 that leads from the bottom wall 26 further into the holding body 2. In a preferred embodiment, the attachment body 23 has a portion 25 that is arranged in the recess 24 and that has an abutment surface 28 that abuts against the bottom wall 26, whereby the attachment body 23 has an arm 20 that extends into the channel 27. The arm 20 has a locking protrusion 21. The locking protrusion 21 engages a part of the holding body 2 that faces away from the bottom wall 26, such that the engagement of the locking protrusion 21 with this part prevents the attachment body 23 from being pulled out of the recess 24.

FIGS. 5 and 8 show the lock 1 without the attachment body 23 and the torsion bar 17 to allow for a better understanding of the movement of the lever 3.

As can best be seen from FIG. 6, the wall 6 that borders the receptacle 4 is arranged on a first part of the holding body 2 (left hand side in FIG. 6), whereby a further wall 7 that is arranged on the other side of the receptacle 4 and faces the wall is additionally provided, whereby the further wall 7 is arranged on a second part of the holding body 2 (right hand side in FIG. 6). The first part of the holding body 2 has an upper surface that is arranged in a first plane, whereby the second part of the holding body 2 has an upper surface that is arranged in a second plane, whereby the first plane is above the second plane. The first part of the holding body 2 is longer than the second part of the holding body 2.

Figure 4:
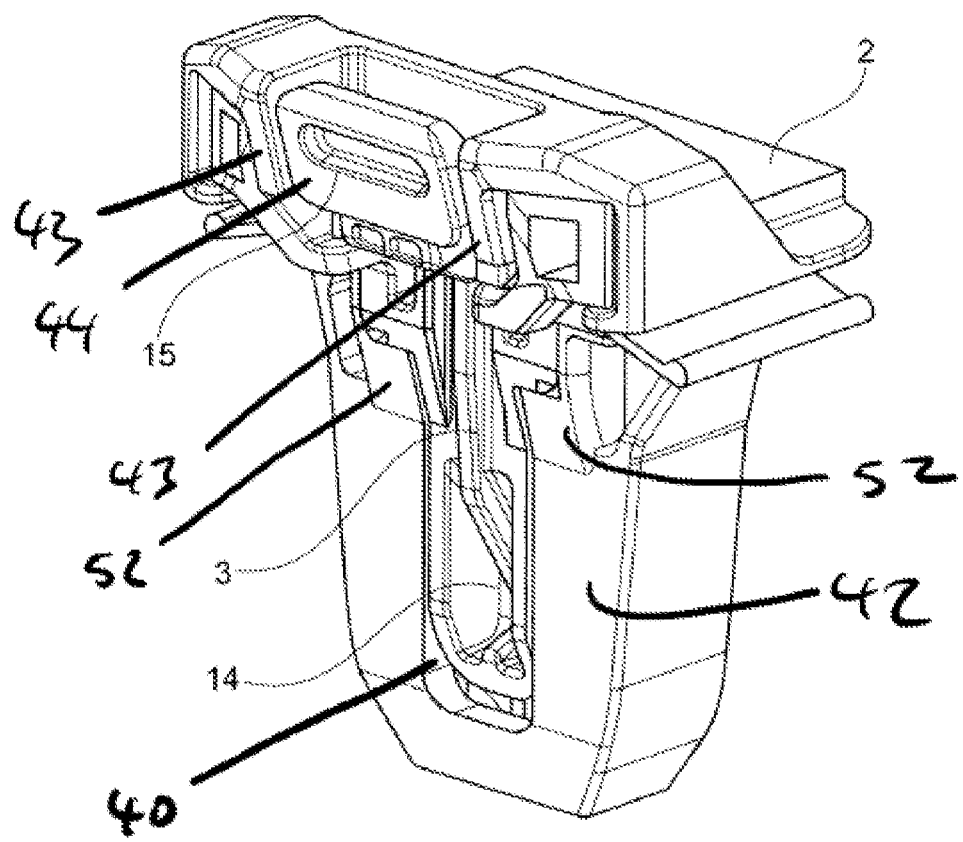
FIG. 4 shows a further perspective view of the lock according to the invention according to FIG. 1, the protrusion being in the locking position.

As can best be seen from FIGS. 4 and 5 the holding body 2 has an outward facing surface 43 that is arranged flush with an outward facing surface 44 at the second end 15 of the lever 3. The first part of the holding body 2 has an outward facing surface 43 that is arranged flush with an outward facing surface 44 at the second end 15 of the lever 3. Having on outward facing surface 43 of holding body 2 being arranged flush with an outward facing surface 44 of the lever 3 prevents the lever 3 from being pushed by a large object. Having on outward facing surface 43 of holding body 2 being arranged flush with an outward facing surface 44 of the lever 3 requires the lever 3 to be pushed by an element that has the same size or is smaller than the outward facing surface of the lever 3. As can be seen from FIGS. 1, 4 and 6, no part of the second end 15 of the lever 3 protrudes over an outward facing surface of the holding body 2 when the lever 3 is in the first position.

Starting from the first position of the locking element shown in FIG. 6, 7 applying a force to the second end 15 of the lever 12 that is directed towards the receptacle 4 leads to a swivel movement of the lever 12 about the axis of the torsion bar 17 and a movement of the protrusion 11 in the retraction direction A. In doing so, the protrusion 11 could be moved from the locking position (FIG. 6,7) to the release position (FIG. 8).

The torsion bar 17 operates as a spring. In the first position of the locking element 3 (FIG. 6,7) the torsion bar 17 is relaxed. As the locking element 3 is moved from the first position toward the second position the torsion bar 17 is twisted and hence loaded.

In a method for disassembly and starting from the first position of the locking element 3 as shown in FIG. 6,7
  a force is applied to the second end 15 that is directed towards the receptacle 4, which leads to a swivel movement of the lever 12 about the axis of the torsion bar 17 and hence a swivel movement about a rotational joint and a movement of the protrusion 11 in the rotational retraction direction A into the second position (FIG. 8), whereby in the second position the protrusion 11 is in a release position, whereby in the release position
    the protrusion 11 either protrudes from the wall 6 into the receptacle by a second amount, whereby the second amount is smaller than the first amount,
    or the protrusion 11 does not protrude from the wall 6, and
  the u-shaped protruding part 5 is moved out of the receptacle 4.

FIG. 5 shows that the holding body 2 has a first wall 6 that borders the receptacle 4, whereby in the locking position the protrusion 11 protrudes from the first wall 6 into the receptacle 4 by a first amount and whereby in the release position
  the protrusion 11 protrudes from the first wall 6 into the receptacle 4 by a second amount, whereby the second amount is smaller than the first amount, whereby the holding body 2 has a second wall 7 that borders the receptacle 4, whereby the second wall 7 is arranged opposite the first wall 6 and whereby the second wall 7 has a recess 30, whereby the protrusion 11 has a tip 31, whereby the protrusion 11 can be brought into a position (shown in FIG. 6), where the tip 31 of the protrusion 11 engages the recess 30 in the second wall 7. The tip 31 of the protrusion 11 preferably engages the recess 30 in the second wall 7 when the protrusion 11 is in the locking position. The recess 30 is provided by way of a section 32 of the second wall 7 protruding towards the first wall 6 over other sections 33 of the second wall 7.

FIG. 6 shows that the wedge shaped protrusion 11 can have a push back surface 34 at its underside that can come into contact with the protruding part 5 as the protruding part 5 is moved upwards and if the protrusion 11 is in the release position or close to the release position. If for example the protrusion 11 has been moved from the locking position (shown in FIG. 5) towards the release position and has either reached the release position or is close to the release position and in this position is in the way of the protruding element 5, the push back surface 34 of the protrusion 11 can lead to the protruding part 5 pushing the protrusion 11 further into the release direction A when the protruding part 5 contacts the push back surface 34 of the wedge shaped protrusion 11.

FIG. 6 shows that the protrusion 11 can have a pull out surface 35 at its underside that is pointing towards the wall 6 and is arranged at an angle to the release direction, whereby the pull out surface 35 can come into contact with the protruding part 5 as the protruding part 5 is moved upwards and if the protrusion 11 is in the locking position or close to the locking position (FIG. 6). If for example the protrusion 11 is in the locking position or close to the locking position (FIG. 6) and in this position is in the way of the protruding element 5, the pull out surface 35 can lead to the protruding part 5 pulling the protrusion 11 further away from the wall 6 and against the release direction when the protruding part 5 contacts the pull out surface 35.

Figure 9:
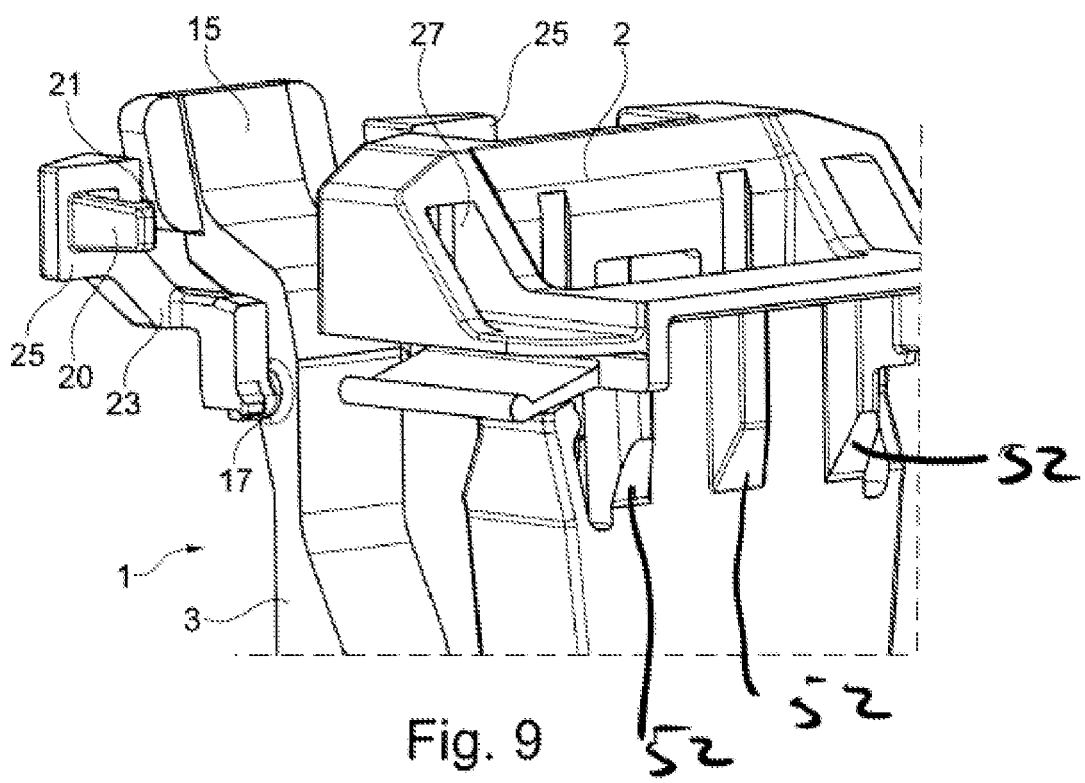
FIG. 9 a schematic exploded view from behind a lock according to the invention showing the holding body and the locking element set apart.
Figure 10:
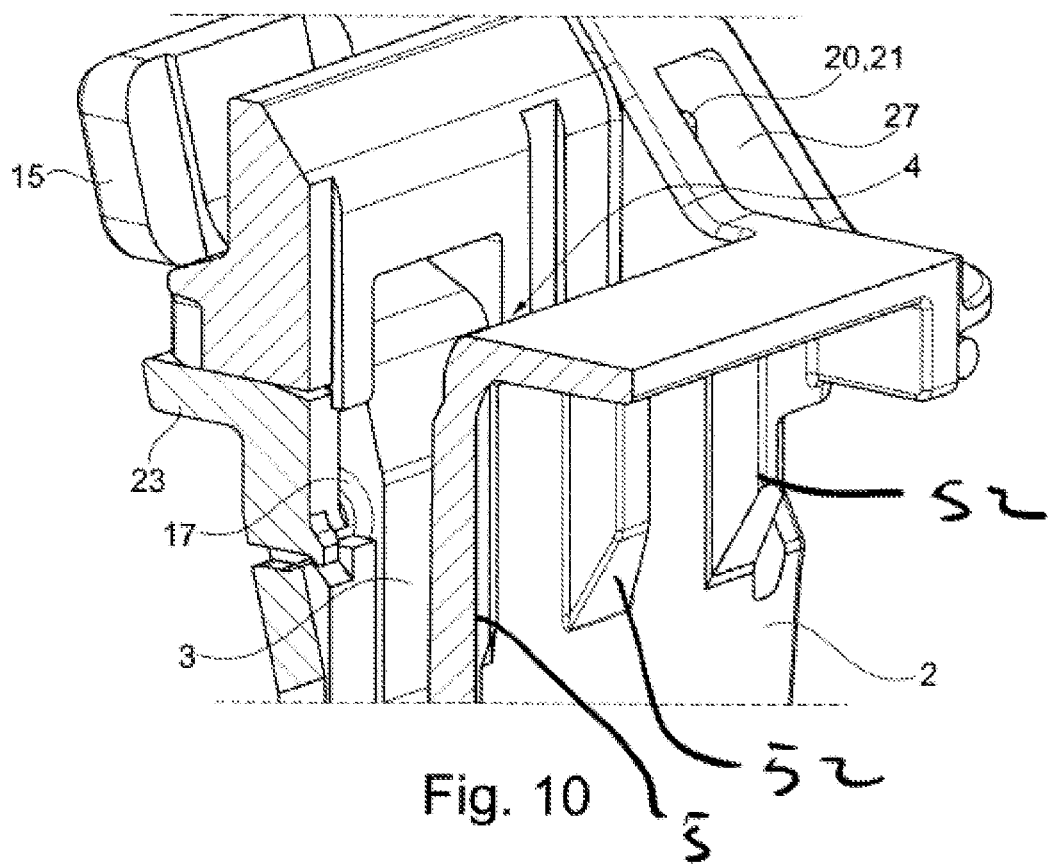
FIG. 10 the schematic, partially sectional perspective view from behind the lock according to FIG. 9.

FIGS. 9 and 10 show a further embodiment of the lock 1, whereby the same reference numerals are used for like parts. The embodiment of FIGS. 9 and 10 shows that the torsion bar 17 has been amended in its shape in comparison to FIG. 3 (is more round than the design of the torsion bar in FIG. 3) and the attachment body 23 has been slightly redesigned.

FIG. 1, 2, 4, 5, 6, 8 show that the wall 6 that borders the receptacle 4 has a hole 40. The locking element 3 protrudes through the hole 40 into the receptacle 4 as best seen in FIG. 6. The locking element 3 has a second position (shown in FIGS. 5 and 8). In the second position the protrusion 11 protrudes from the wall 6 into the receptacle 4 by a second amount, whereby the second amount is smaller than the first amount. As best shown in FIG. 6 the locking element is arranged partially in the hole 40 in the second position. When the locking element 3 is moved from the first position (the locking position; eg. FIG. 6) into the second position (the release position, e.g. FIG. 8) the locking element is moved more deeply into the hole 40. As best seen in FIGS. 5 and 8 the locking element at least partially protrudes from the wall 40 that borders the receptacle 4 at the opposite side compared to the receptacle 4. The wall 6 may have a first surface 41 that borders the receptacle 4 and a second surface 42 that is arranged on the opposite side of the wall 6 and hence faces away from the receptacle. The locking element 3 protrudes from this second surface 42 in the second position (see FIGS. 5 and 8). The locking element 3 in the first position is partially arranged within the hole 40 (see FIG. 6), but is moved more deeply into the hole 40 as the locking element 3 moves from the first position to the second position (see FIGS. 5 and 8).

Figure 11:
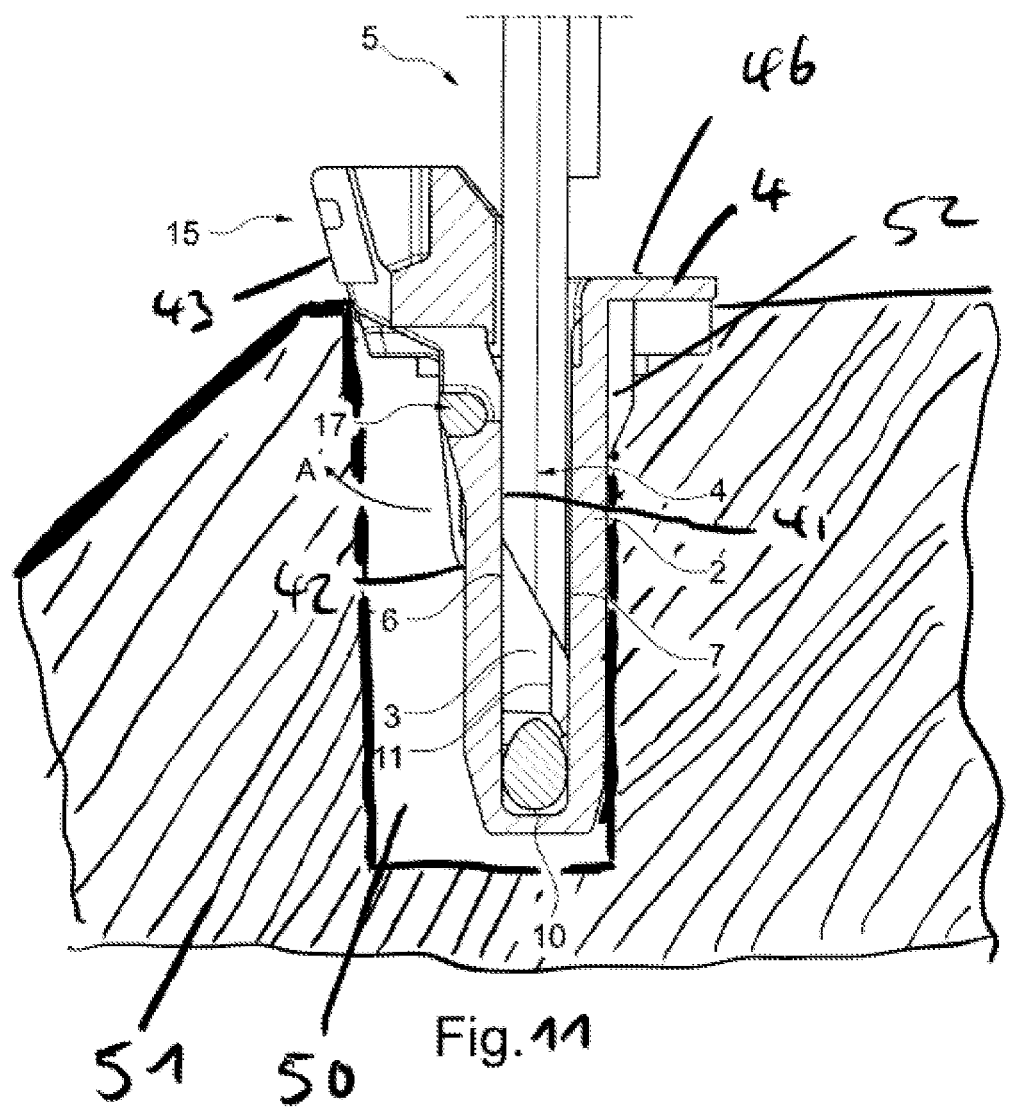
FIG. 11 a sectional view of assembly according to the invention arranged in a recess of a first part.

As best seen in FIG. 1, the holding body 2 has attachment projections 45, 46, 47 that can be used to attach the holding body to the first part (not shown in FIG. 1). FIG. 11 shows a sectional view of assembly according to the invention. The holding body 2 is arranged in a recess 50 of a first part 51. The attachment projections 46 defines the position of the holding body 2 inside the recess 50 of the first part 51, namely determines how deep the holding body 2 is inserted into the recess 50. The attachment projections 46 protrudes laterally from the holding body 2 and comes into surface contact with a lateral surface of the first part 51 that surrounds the recess 50 of the first part 51, thereby defining the position of the holding body 2 inside the recess 50 of the first part 51. The holding part is attached to the first part 51 by way of gluing the attachment projection 46 to the first part 51. In addition the holding body is be wedged into the recess 50 of the first part 51. Ribs 52 are provided on outward facing surfaces of the holding body that aid the wedging into the recess of the first part.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen " " or dash "—" in a range of values is "to" or "through"; a ">" is "above" or "greater-than"; a " " is "at least" or "greater-than or equal to"; a "<" is "below" or "less-than"; and a " " is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims.

The subject matter of all combinations of independent and dependent claims, both single and multiple dependent, is herein expressly contemplated.

What is claimed is:

1. A lock for holding a first part to a second part, the lock comprising:
    a holding body with a receptacle for receiving a protruding part of the second part, the holding body having a wall that borders the receptacle,
    a locking element, the locking element having a protrusion, whereby
        the locking element has a first position, whereby in the first position the protrusion is in a locking position, whereby in the locking position the protrusion protrudes from the wall into the receptacle by a first amount, and
        the locking element has a second position, whereby in the second position the protrusion is in a release position, whereby in the release position:
            the protrusion either protrudes from the wall into the receptacle by a second amount, whereby the second amount is smaller than the first amount, or
            the protrusion does not protrude from the wall,
        whereby the protrusion can be moved from the locking position to the release position in a rotational retraction direction relative to the holding body, and
    a lever, whereby
        the lever has a first end and a second end that is arranged opposite the first end, whereby the protrusion is attached to the first end of the lever or forms part of the first end of the lever, and the lever is connected to the holding body by a rotational joint or is connected to an attachment body by a rotational joint,
        whereby the attachment body is attached to the holding body, whereby the rotational joint is arranged between the first end and the second end of the lever, and
        when applying a force to the second end that is directed towards the receptacle: the lever undergoes a swivel movement in the rotational joint, and the protrusion undergoes a movement in the retraction direction.

2. The lock according to claim 1, wherein a locking protrusion is arranged at the attachment body, whereby the locking protrusion can releasably engage with a part of the holding body to hold the attachment body in a predetermined position.

3. The lock according to any one of claim 1, wherein the attachment body has a guide arm, whereby the guide arm is arranged in a channel in the holding body.

4. The lock according to claim 1, wherein the rotational joint defines a rotational axis and that the lever swivels about the rotational axis, whereby the rotational axis is not parallel to an insertion direction, whereby the insertion direction is the direction along which the protruding part of the second part is intended to be inserted into the receptacle.

5. The lock according to claim 1, further comprising a torsion bar that extends from the lever, which torsion bar has an end that is held in the holding body.

6. The lock according to claim 1, wherein the locking element is arranged at least partially inside the hole or inside the recess in the second position.

7. The lock according to claim 1, wherein the holding body has an outward facing surface that is arranged flush with an outward facing surface at the second end of the lever.

8. An assembly of a first part and a second part, whereby the first part is connected to the holding body of the lock according to claim 1, and
    the second part comprises a protruding part with an opening or a recess, whereby the protruding part is arranged in the receptacle,
    wherein the protrusion of the locking element is in the first position and at least partially arranged inside the protruding part.

9. A method for disassembly of an assembly according to claim 8, wherein:
    a force is applied to the second end that is directed against towards the receptacle, which leads to a swivel movement of the lever in the rotational joint and a movement of the protrusion in the retraction direction into the second position the protrusion is in a release position, whereby in the release position:

the protrusion either protrudes from the wall into the receptacle by a second amount, whereby the second amount is smaller than the first amount, or the protrusion does not protrude from the wall, the u-shaped protruding part is moved out of the receptacle.

10. A method for assembly of an assembly according to claim 8, wherein:

in a first step the protruding part of the second part is arranged inside the receptacle of the lock and the protrusion of the locking element is in the first position and at least partially arranged inside the protruding part, and in a second step the first part is connected to the holding body of the lock.

* * * * *